Jan. 2, 1951 A. P. RIPPENBEIN 2,536,466
FOLDING PEDAL YOKE
Filed May 27, 1948 2 Sheets-Sheet 1
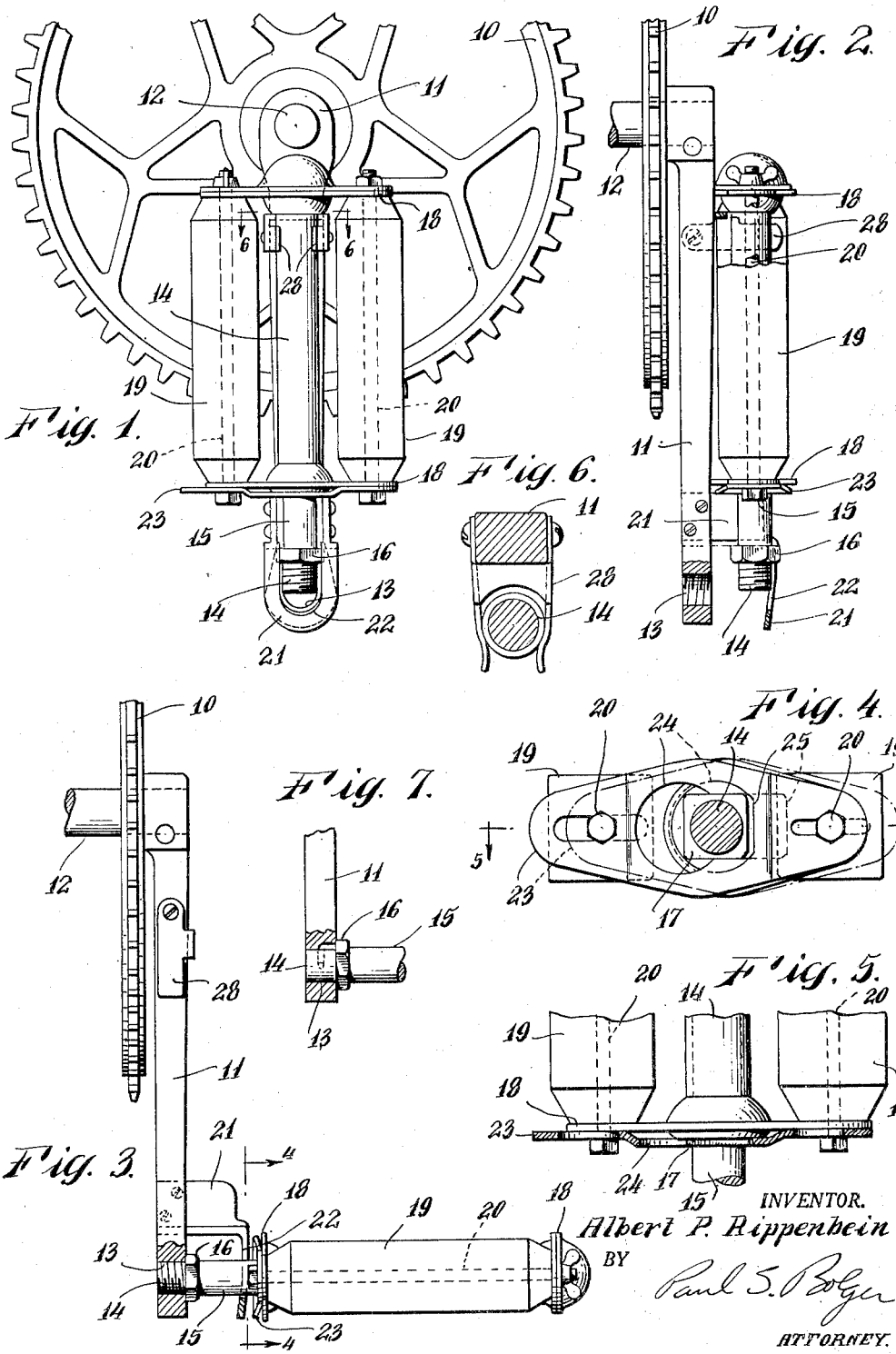
INVENTOR.
Albert P. Rippenbein
BY
Paul S. Bolger
ATTORNEY.

Jan. 2, 1951     A. P. RIPPENBEIN     2,536,466
FOLDING PEDAL YOKE
Filed May 27, 1948     2 Sheets-Sheet 2
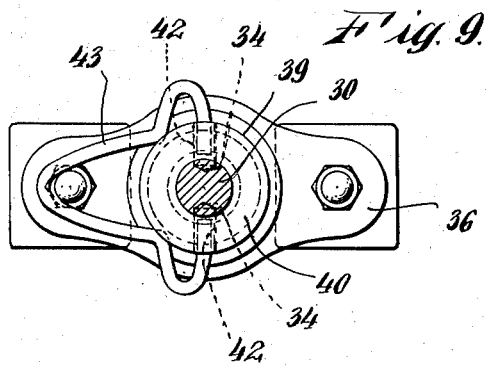
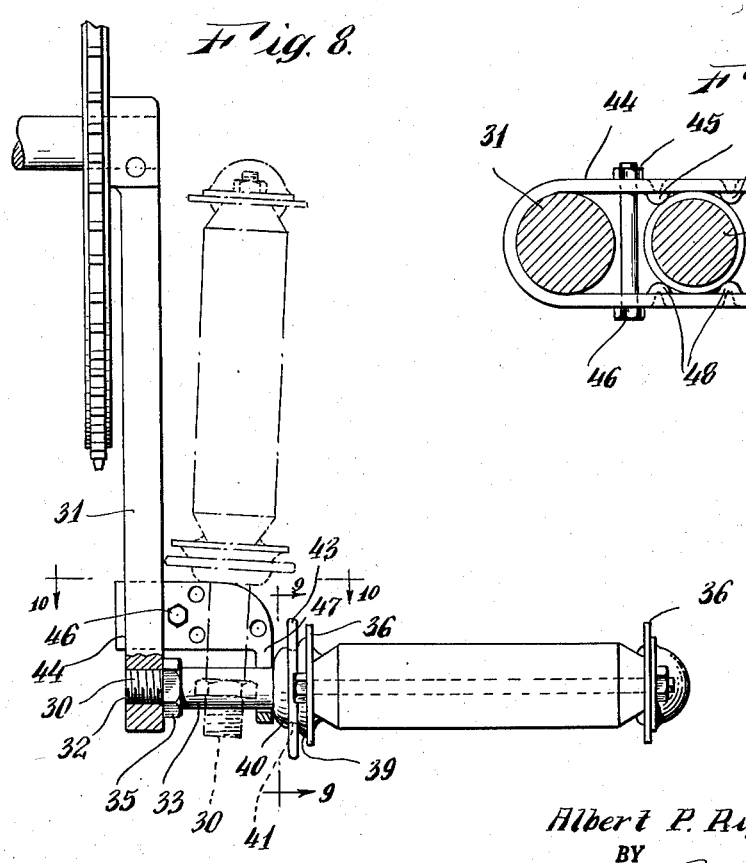
INVENTOR.
Albert P. Rippenbein
BY
Paul S. Bolger
ATTORNEY.

Patented Jan. 2, 1951

2,536,466

UNITED STATES PATENT OFFICE 2,536,466

FOLDING PEDAL YOKE

Albert P. Rippenbein, New York, N. Y.

Application May 27, 1948, Serial No. 29,464

7 Claims. (Cl. 74—594.7)

This invention relates to driving means for bicycles and is specifically directed to the provision of a novel combination of parts whereby the pedal axles or shafts (and therefore the pedals mounted thereon) may be quickly detached from operative engagement with the cranks and temporarily fixed in a position adjacent the cranks and approximately parallel thereto so that, in effect, the pedals lie in the same general plane occupied by the other bicycle parts.

This application is a continuation in part of my copending application filed April 6, 1945, Serial Number 586,962.

The protrusion of the pedals from the general area occupied by the frame of the bicycle prevents compact packing of the bicycles against the side of a vehicle and likewise complicates the stacking of the bicycles one against the other when, as in the case of military usage, quantities of bicycles must be quickly handled and transported. Removal and assembly of the pedal shafts from or on the cranks involves the use of a wrench or similar tool which is not always readily at hand. Moreover, the pedal shafts and their attached pedals once removed are easily lost or misplaced. Therefore where bicycles are alternatively transported and used, ready removal of the pedals from their operative position into the plane of the other bicycle parts without detachment of the pedal shafts and their attached pedals from said parts, is particularly advantageous.

The present invention, which provides a means by which the advantages above-mentioned may be realized, relates to a combination of crank, pedal shaft and pedal so linked together that the pedal shaft and the attached pedal once removed from operative engagement with the crank, may, without actual detachment from the crank, be quickly fixed into a temporary position alongside and adjacent the crank. Other features of the invention include, in combination with the pedal and pedal shaft, means by which the pedal may itself become the medium through which turning moment is applied to disengage the pedal shaft from operative connection with the crank thereby eliminating the use of any separate tool for this purpose.

Preferred embodiments of this invention are illustrated in the attached drawing; in which Fig. 1 illustrates, in side elevational view, an assembly of sprocket, crank, pedal shaft and pedal with the pedal parts fixed in the temporary or nonoperative position;

Fig. 2 is a front elevational view, with some parts in section, of the assembly shown in Fig. 1;

Fig. 3 is a front elevational view, with some parts in section, of the same assembly with the pedal parts now in operative position on the crank;

Fig. 4 is a view of the parts shown in Fig. 3 taken at the line 4—4 as indicated in Fig. 3;

Fig. 5 is a view, partly in elevation and partly in section, of the parts shown in Fig. 4, when viewed as indicated by the line 5—5 of the latter figure;

Fig. 6 is a sectional view taken through the crank and the pedal shaft in the plane indicated by the line 6—6 on Fig. 1;

Fig. 7 illustrates, partly in section and partly in elevation, an alternative form of locking arrangement between the crank and the pedal shaft when the pedal parts are in operative position;

Fig. 8 is a front elevational view of a crank, sprocket and pedal assembly embodying an alternate form of locking arrangement with some parts in sections showing the pedal parts in operative position on the crank, the dot and dash line indicating the position of the pedal when the pedal shaft has been removed from operative position;

Fig. 9 is a view of the parts shown in Fig. 8 taken at the line 9—9 in Fig. 8; and Fig. 10 is a sectional view taken through the crank and pedal shaft along the line 10—10 in Fig. 8.

Referring to Figures 1 to 7, the sprocket 10 and crank 11 are fixed to a drive shaft 12. An aperture 13 located at the extremity of the crank provides means for operatively engaging a pedal shaft in crank driving position, i. e., at approximate right angles to the crank.

The pedal shaft 14 may best be described as comprising an axle, upon which the pedals are rotatively and conventionally mounted, and an intermediate or extending portion 15 which spaces the axle portion from the crank engaging end of the shaft. A shoulder 16 on the pedal shaft serves its usual function as an abutment to limit the movement of the end of the shaft into crank aperture 13 and has, in addition, another function later herein described.

The pedal structure proper consists of crossed arms 18 suitably journaled for rotation on the axle portion of the shaft 14. Between said arms 18 and mounted on bolt axles 20 which extend through the arms 18 are the rubber pads 19. Except for the extension or intermediate portion 15 of the pedal shaft and the planar surface provided by the flat-faced shoulder 17, the function of which will be described herein, the parts thus far described are conventional in design and their assembly is found in most bicycles. Specific construction of these parts is of little consequence to this invention. In fact it is a feature of this invention that a modern bicycle may be adapted to embody the principles thereof by the substitution of a new pedal shaft, and the addition to the conventional assembly of various parts now to be described.

One such part is the means 21 fixed to the crank 11 intermediate its ends which means is designed to provide a loose but positive connection between the pedal shaft and crank thereby preventing the removal of the pedal from the bicycle but allowing movement of the pedal shaft and its attached pedal from operative position to a position adjacent and parallel to the crank. Means 21 is, therefore, in effect, a loose pivot and, in the form here shown, consists of an upwardly extending yoke-like arm which defines a slot or aperture 22 sized to receive and loosely surround the intermediate shaft portion 15, the shoulder 16 serving as means to prevent the shaft end from slipping through the slot 22 and thereby disengaging the pedal parts from the closed yoke. Likewise mounted on the crank 11, and at a point spaced from the coupling means 21, is the clip 28 which serves as a means to grasp the pedal shaft 14 as it is raised to its non-operative position adjacent the crank 11. The function and action of said clip is clearly shown in Figs. 1 and 6. The clip 28 is so mounted on crank 11 that it may be swung out of its functional position into the position shown in Fig. 3 when the pedal parts are operatively mounted on the crank, thereby avoiding inconvenience or injury to the operator of the bicycle. Thus, by providing a pedal shaft of suitable configuration and by mounting on the crank the means 21 to loosely yoke the shaft to the crank and provide a loose pivot and guideway for the movement of the shaft from its operative to its non-operative position, in which latter position it is maintained by the means 28, I am able, by simple alteration of any bicycle, to provide a crank and pedal assembly the parts of which may be quickly collapsed or "folded" into the general plane of the other parts of the bicycle.

Referring now to Figs. 8 and 10 showing alternate forms of my invention, the pedal shaft 30 is operatively fixed to the crank 31 at aperture 32 located at the extremity of the crank 31 which is in turn fixed to the standard bicycle shaft and sprocket.

The pedal shaft 30 comprises an axle portion upon which pedals are mounted in the conventional manner and an intermediate portion 33 which spaces the axle portion from the crank engaging end of the shaft. The shoulder 35 serves as an abutment to limit the movement of the end of the shaft into the crank aperture 32 and also the function now described.

A yoke like member 44 is fixed to the crank 31 adjacent the pedal shaft receiving aperture 32. The yoke is rigidly snubbed on the crank 31 by the tightening of nut and bolt 45, 46. The yoke is provided as a pivot means for a loose but positive connection between the pedal shaft 30 and the crank 31 to prevent the removal of the pedal from the bicycle but allowing movement of the pedal shaft and pedal from operative position to a position parallel to the crank 31. The yoke defines a slot or aperture 47 sized to receive and loosely surround the intermediate portion of the pedal shaft 33. The shoulder 35 serves as means to prevent shaft from slipping through the slot 47. Nodular projections 48 are arranged on the inner surfaces of the yoke 44 so that when the pedal shaft 30 is swung out of operative position to a position substantially parallel to the crank 31, the camming action of the shaft against the projections 48 on the opposed inner surfaces of the yoke cause the side walls of the yoke to yield slightly and to snap back to their original position after the shaft has passed thereby effectively locking the shaft in the non-operative position adjacent the crank 31 as shown by the dot dash line in Fig. 8 and as shown in Fig. 10.

The combination of parts described will serve to good purpose when used as such, but their usefulness is increased by a further and optional feature by which the use of a separate tool for disengaging the pedal from the crank or re-engaging the pedal with the crank is eliminated. To this end I provide means for temporarily locking the pedals against rotation on the pedal shaft, thus allowing the use of the relatively broad surfaces of the pedal assembly as a lever to exert sufficient turning motion on the shaft to engage or disengage the interlocking surfaces formed on the crank aperture 13 and the end of the shaft 14. These interlocking surfaces may take various forms, such as the conventional screw threads illustrated in Figs. 1, 2 and 3 or the bayonet type of locking surfaces illustrated in Fig. 7 or any other surfaces formed to frictionally engage when the shaft end is inserted and turned within the crank aperture. While the means by which the pedal arms 18, and thereby the pedals, are locked against rotation on shaft 14 may take various forms, one form is shown in Figs. 1-7 and comprises the use of a movable or locking plate 23 bearing a surface which may be moved into engagement with the planar surface presented by the squared shoulder 17 formed on the pedal shaft thereby locking the pedals against rotation on the shaft. In the specific form shown in the drawings the movable plate 23 defines a large opening 24 which, when the plate is lying in its normal or dot and dash line position (indicated in Fig. 4), axially corresponds with shaft 14, thus allowing the pedals to rotate freely. The plate is likewise provided with the square-shaped aperture 25 is so located that shifting of the plate to its locking, or full-line, position (see Fig. 4) will bring this square aperture into contact with the surfaces of the squared shoulder 17, thus forming a positive lock between the pedals and the pedal shaft.

An alternate form of temporarily locking the pedal against rotation on the pedal shaft for disengaging and re-engaging the pedal and the crank, is shown in Figs. 8 and 9. The pedal shaft 30 at the juncture of the axle portion and intermediate portion 33 is provided with drill holes or depressions 34, which are diametrically opposed. The hub 39 mounted on cross arm 36 of a conventional pedal structure has a knoblike head portion 40 and an annular groove 41 at the base of the knob 40; two diametrically opposed radial channels extend from the trough of the groove to the pedal shaft 30, the channels having the same diameter as the depressions 34 in the shaft and positioned so that they may be aligned with the depressions; a spring steel wire clip 43 having a configuration as shown in Fig. 9 is positioned in the channel 42.

The pedal is locked on the shaft 30 so that it may be used as a wrench to remove the pedal shaft from aperture 32 by pivoting the wire clip 43 past the head portion 40 to permit the opposed ends of the spring clip to enter the depressions 34 in the shaft 30. To release the locking means the clip is returned to the position shown in Figs. 8 and 9, the opposed ends are moved apart and retract from the depressions by camming action of the wire clip as it moves over the surface of knob 40. The annular groove 41 retains the spring clip to prevent accidental locking.

The locking and wrenching means outlined above to which claims were originally asserted in the application of which this application is a continuation in part are now claimed in Letters Patent No. 2,470,414, granted May 17, 1949.

My invention has been described herein using for examples several alternative forms and it will be understood that an interchange of the parts and a substitution or change in form of the parts may be made without a departure from the principles of my invention. It is not intended to limit my invention to the illustrated forms except as such limitations are expressed in the appended claims.

I claim:

1. In a bicycle driving device a crank attachable at one end to drive a shaft and adapted at its other end to receive a pedal shaft in cranking position, a pedal shaft formed of an axle portion, a crank engaging end, a shoulder adjacent said end and a portion intermediate said shoulder and said axle, a pedal rotatably mounted on said axle, means fixed on said crank intermediate its ends and shaped to form an outwardly extending yoke sized to loosely surround the intermediate portion of said shaft, positioned around said shaft to form a loose pivot for movement of the shaft from its operative position to a position substantially parallel and adjacent to said crank, said shoulder being sized to prevent the disengagement of the pedal shaft from said means, a second means carried on said yoke and positioned to engage and retain the pedal shaft when it is moved to a position parallel to the crank.

2. In a bicycle driving device a crank attachable at one end to drive a shaft and adapted at its other end to receive a pedal shaft in cranking position, the pedal shaft being formed of an axle portion, a crank engaging end, a shoulder adjacent said end and a portion intermediate said shoulder and said axle, a pedal rotatably mounted on said axle, means fixed on said crank intermediate its ends and forming an outwardly extending yoke sized to loosely surround the intermediate portion of said shaft and positioned to form a loose pivot for movement of said shaft from its operative position to a position parallel and adjacent to said crank, said shoulder being sized to prevent the passage of the pedal shaft through said yoke, and at least one projection positioned on the inner surface of said yoke sufficiently restricting the passage of the intermediate portion of the shaft as it is pivoted so that it must be forced past the projection into position parallel to the crank, said projection thereby retaining the shaft in its position parallel to the crank.

3. In a bicycle driving device a crank attachable at one end to drive a shaft and adapted at its other end to receive a pedal shaft in cranking position, a pedal shaft formed of an axle portion, a crank engaging end, a shoulder adjacent said end and a portion intermediate said shoulder and said axle, a pedal rotatably mounted on said axle, means fixed on said crank intermediate its ends and forming an outwardly extending yoke sized to loosely surround and contain the intermediate portion of said shaft whereby to form a loose pivot for movement of said shaft from its operative position to a position parallel and adjacent to said crank, said shoulder being sized to prevent the disengagement of the pedal shaft from said yoke, a second means associated with said means to receive and maintain the shaft in its position parallel and adjacent to the crank, said second means comprising projections on the inner surface of said yoke to yieldingly restrict the passage of the intermediate portion of the pedal shaft as it is pivoted in both directions.

4. In a bicycle driving device a crank attachable at one end to a drive shaft and adapted at its other end to receive a pedal shaft in cranking position, a pedal shaft formed of an axle portion, a crank engaging end, a shoulder adjacent said end and a portion intermediate said shoulder and said axle, a pedal rotatably mounted on said axle, means fixed on said crank intermediate its ends shaped to form an outwardly extending yoke sized to loosely surround and permanently contain at least a part of the intermediate portion of said shaft whereby to form a loose pivot for the movement of the shaft from its operative position to a position parallel and adjacent to said crank, said shoulder being sized to prevent the disengagement of the pedal shaft from said means.

5. In a bicycle driving device a crank attachable at one end to a drive shaft and adapted at its other end to receive a pedal shaft in cranking position, a pedal shaft formed of an axle portion, a crank engaging end, a shoulder adjacent said end and a portion intermediate said shoulder and said axle, a pedal rotatably mounted on said axle, means fixed on said crank intermediate its ends shaped to form an outwardly extending yoke sized to loosely surround and permanently contain at least a part of the intermediate portion of said shaft whereby to form a loose pivot for the movement of the shaft from its operative position to a position parallel and adjacent to said crank, said shoulder being sized to prevent the disengagement of the pedal shaft from said means, and a means carried on said crank and positioned to engage and retain the pedal shaft when said shaft is moved to a position parallel to said crank.

6. In a bicycle driving device a crank attachable at one end to a drive shaft and adapted at its other end to receive a pedal shaft in cranking position, a pedal shaft comprising an axle portion, a crank engaging end, a shoulder adjacent said end and a portion intermediate said shoulder and said axle, a pedal rotatably mounted on said axle, means fixed on said crank intermediate its ends and forming an outwardly extending yoke sized to loosely surround and permanently contain at least a part of said intermediate portion of said shaft and positioned to form a loose pivot to guide and contain said shaft in the movement of said shaft from its operative position to a position parallel and adjacent said crank, said shoulder being sized to prevent the passage of the pedal shaft through said yoke.

7. In a bicycle driving device, a crank attachable at one end to a drive shaft and provided at its other end with a threaded opening to receive a pedal shaft in cranking position, a pedal shaft comprising an axle portion, a threaded crank-engaging end adapted to fit into and to be engaged releasably in the threaded opening of the crank, and a portion intermediate said shoulder and said axle, a pedal rotatably mounted on said axle, means fixed on said crank intermediate its ends and forming an outwardly extending yoke of sufficient size to loosely surround and permanently contain at least a part of said intermediate portion of said shaft and poistioned to form a loose pivot to guide and contain said shaft in its movement from the operative position to a position parallel and adjacent said crank, said yoke permitting the rotation of the pedal shaft so that the screw connection of the threaded end of the pedal shaft with the threaded opening in the crank may be effected while the shaft is surrounded by the yoke, and means disposed on said shaft to prevent disengagement of the shaft with said yoke and means for engaging the shaft and maintaining it in the inoperative position.

ALBERT P. RIPPENBEIN.

REFERENCES CITED

The following references are of record in the file of this patent:

FOREIGN PATENTS

| Number | Country | Date |
|---|---|---|
| 11,910 | Great Britain | July 2, 1900 |